US012603720B2

(12) United States Patent　(10) Patent No.:　US 12,603,720 B2
Shi et al.　(45) Date of Patent:　Apr. 14, 2026

(54) SYSTEMS AND METHODS FOR COUPLING OPTICAL NETWORKS

(71) Applicant: IP Infusion, Inc., Santa Clara, CA (US)

(72) Inventors: Chao Xiang Shi, Saratoga, CA (US); Mudit Wahal, Santa Clara, CA (US); Abhijeet Prabhune, Santa Clara, CA (US); Shaji Nathan, Santa Clara, CA (US); Vinayak Kamat, Santa Clara, CA (US)

(73) Assignee: IP Infusion, Inc., Santa Clara, CA (US)

( * ) Notice: Subject to any disclaimer, the term of this patent is extended or adjusted under 35 U.S.C. 154(b) by 253 days.

(21) Appl. No.: 18/470,366

(22) Filed: Sep. 19, 2023

(65) Prior Publication Data

US 2024/0106559 A1　Mar. 28, 2024

Related U.S. Application Data

(60) Provisional application No. 63/409,587, filed on Sep. 23, 2022.

(51) Int. Cl.
_H04J 14/02_　(2006.01)
(52) U.S. Cl.
CPC ................................. _H04J 14/0221_ (2013.01)
(58) Field of Classification Search
CPC .. H04J 14/0221; H04J 14/02; H04J 14/02216; H04B 10/07955; H04B 10/564; H04B 10/541; G02B 6/266; G02B 6/29391; G02B 6/4215
See application file for complete search history.

(56) References Cited

U.S. PATENT DOCUMENTS

| | | | |
|---|---|---|---|
| 6,917,747 B2 | 7/2005 | Xiao et al. | |
| 11,323,199 B2 * | 5/2022 | Deng ................. | H04B 10/2537 |
| 2003/0053750 A1 * | 3/2003 | Yang ................. | G02B 6/29311 385/27 |
| 2016/0094305 A1 * | 3/2016 | Yamashita ........... | H04B 10/564 398/79 |
| 2020/0044766 A1 | 2/2020 | Deng et al. | |

(Continued)

OTHER PUBLICATIONS

IP Infusion, Inc., PCT/US2023/033405, International Search Report and Written Opinion dated Aug. 1, 2024, 11 pgs.
(Continued)

*Primary Examiner* — Hibret A Woldekidan
(74) *Attorney, Agent, or Firm* — Morgan, Lewis & Bockius LLP

(57) ABSTRACT

The various implementations described herein include methods, devices and systems for power modulation and optical network coupling. A device includes a plurality of optical input ports and a plurality of optical output ports. The device further includes an array of power modulation components, each power modulation component coupled between a respective input port of the plurality of input ports and a corresponding output port of the plurality of output ports. The device also includes control circuitry coupled to the array of power modulation components, the control circuitry configured to: obtain power level information for the plurality of input ports; and adjust power modulation for one or more of the array of power modulation components based on the power level information such that output power levels are substantially similar.

20 Claims, 5 Drawing Sheets

(56) References Cited

U.S. PATENT DOCUMENTS

2022/0158734 A1    5/2022  Lee
2022/0303038 A1*  9/2022  Zhang ................. H04J 14/0221

OTHER PUBLICATIONS

IP Infusion, Inc., PCT/US2023/033405, International Preliminary Report on Patentability dated Mar. 1, 2025, 7 pgs.
IP Infusion, Inc., AU2023347509, Examination Report No. 1 dated Dec. 15, 2025, 3 pgs.

* cited by examiner

Optical Transmission System 200

SYSTEMS AND METHODS FOR COUPLING OPTICAL NETWORKS

PRIORITY AND RELATED APPLICATIONS

This application claims priority to U.S. Provisional Patent App. Ser. No. 63/409,587, filed Sep. 23, 2022, entitled "Systems and Methods for Coupling Optical Networks," which is incorporated by reference herein in its entirety.

TECHNICAL DATA FIELD

This application relates generally to optical networks, including but not limited to, devices for power modulation and/or balancing of optical signals.

BACKGROUND

Various optical networks have been deployed all over the world (e.g., 10G dense wavelength-division multiplexing (DWDM) networks) in metro, regional, and long-haul networks. New, higher bandwidth devices continue to be developed (e.g., 400G ZR/ZR+ devices). However, the new higher bandwidth devices have different properties (e.g., wavelength, signal power, etc.) than the older devices. Therefore, the new devices are not generally compatible with existing networks and devices. This means that consumers wanting to use the new devices may need to invest the time and expense of establishing new transmission networks.

SUMMARY

Accordingly, there is a need for devices, methods, and systems for coupling the higher bandwidth devices (e.g., 400G and/or 800G) with existing devices and networks (e.g., 10G, 40G, 100G, and/or 200G).

The present disclosure describes systems and devices for coupling high bandwidth (e.g., 400G ZR/ZR+) service with an existing service network (e.g., 10G DWDM). Coupling the networks and devices allows consumers (e.g., optical network providers) to use their existing legacy systems (e.g., switches, routers, transponders, and/or muxponders) and networks, and incorporate high bandwidth devices without replacement of the existing optical line system (e.g., DWDM multiplexers, demultiplexers, and/or Erbium-doped fiber amplifiers (EDFAs)).

In some embodiments, a variable optical attenuator (VOA) array device is used to balance power of optical signals within an optical network. In at least some situations, the VOA array device has the advantage that the software control is self-contained within the device (e.g., all local decisions at device level without need of a network controller such as a software-defined network (SDN) controller). In at least some situations, the VOA array device has the advantage that it does not require a separate power supply due to its low power consumption (e.g., less than 10 watts). For example, a USB control cable can be used to provide power (e.g., from a 400G switch/router). In some embodiments, when VOA array device is connected to the 400G switch/router, the VOA array device automatically scans and detects each port input power level (e.g., monitors the inputs) and uses the lowest power (e.g., corresponding to a 400G input) to attenuate the other input ports, such that the output for all the signals (e.g., mixed 10G legacy and newly added 400 G ZR/ZR+ signals) is substantially equal and balanced. As mentioned above, the entire process can be performed by the VOA array device itself (e.g., independent of a network controller or other external component).

In some situations and embodiments, addition of the VOA array device to the optical network requires one or more existing signal sources (e.g., corresponding to legacy 10G signals) to be disconnected and then connected through the VOA array device for channel power balancing, (e.g., resulting in an interruption of service). In some embodiments, the VOA array device attenuates the existing signal sources power levels to be substantially equal to the new signal source power levels (e.g., attenuates the 10G signal power to match to the smaller 400 G ZR signal power). In some situations, the attenuated signals are degraded as compared to the original signals (e.g., the optical signal-to-noise ratio (OSNR) is decreased), but remain operable (e.g., the OSNR is above a threshold level of operability).

In some embodiments, an Erbium-doped fiber amplifiers (EDFA) array device is used to balance power of optical signals within an optical network. In some embodiments, the EDFA array device is coupled to new signal sources (e.g., new 400G ZR/ZR+ signal sources) and provides optical amplification for those signals, but is not connected to the existing signal sources in the network (e.g., not connected to existing 10G signal sources). In at least some situations, the EDFA array device has the advantage that it does not impact the legacy (e.g., 10G) connections (e.g., the existing service is not interrupted when a new service (e.g., 400G ZR/ZR+) is added to the network. In some situations, the new signal sources (e.g., the 400G ZR/ZR+ signal sources) are small compared to the existing signal sources and thus only the new signal sources require optical gain to balance with the existing signal sources. In some embodiments, the EDFA array device obtains a highest power level reference (e.g., from a network controller) and adjusts gain for the new signal sources to substantially match the highest power level reference.

In some situations and embodiments, the EDFA array device includes a power supply unit (e.g., its power consumption is higher than the VOA array device). In some situations and embodiments, the EDFA array device requires a target output power to be reported to it (e.g., from an optical switch, router, or WDM transponder corresponding to a legal signal). In some embodiments, the target output power is sent to the EDFA array device via a network controller (e.g., a SDN controller) and a new signal source component (e.g., a 400G ZR/ZR+ signal source).

According to some embodiments, a method is performed at a power modulation device having a plurality of optical input ports, a plurality of optical output ports, and an array of power modulation components. The method includes (i) obtaining power level information for the plurality of input ports; and (ii) adjusting power modulation for one or more of the array of power modulation components based on the power level information such that output power levels are substantially similar (e.g., within 5, 10, or 20% of one another or within 0.5, 1.0, or 2.0 dBm of one another).

According to some other embodiments, an optical system includes: (i) a plurality of optical source components; (ii) a source DWDM component; and (iii) a power modulation device coupled between at least a subset of the plurality of optical source components and the source DWDM component. The power modulation device includes: (a) a plurality of optical input ports; (b) a plurality of optical output ports; (c) an array of power modulation components, each power modulation component coupled between a respective input port of the plurality of input ports and a corresponding output port of the plurality of output ports; and (d) control circuitry coupled to the array of power modulation components, the control circuitry configured to: (1) obtain power level information for the plurality of input ports; and (2) adjust power modulation for one or more of the array of power modulation components based on the power level information such that output power levels are substantially similar.

In some embodiments, a power modulation device includes a plurality of optical input ports, a plurality of optical output ports, control circuitry, and an array of power modulation components. The control circuitry is configured to perform (or causing performance of) any of the methods described herein.

Thus, methods, devices, and systems disclosed herein provide power modulation for optical network coupling. Such methods, devices, and systems may complement or replace conventional methods for coupling optical networks.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The present disclosure describes coupling optical networks and components that have differing properties (e.g., different signal power). For example, a 400G ZR/ZR+ service can be coupled to an existing 10G DWDM service using the devices and methods described herein. In accordance with the present disclosure, a network provider can mix and match different technologies (e.g., 10G, 40G, 100G, 200G, and 400G) over an existing deployed DWDM system.

Figure 1:
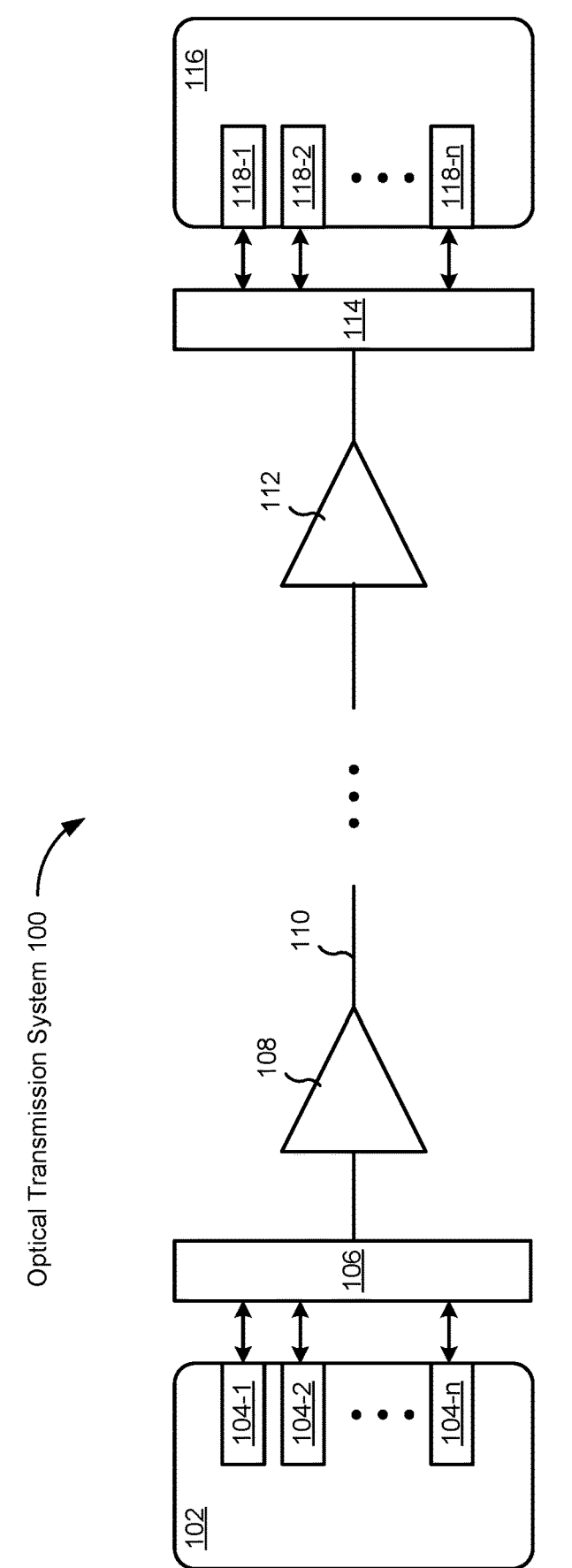
FIG. 1 illustrates an example optical transmission system in accordance with some embodiments.

FIG. 1 illustrates an optical transmission system 100 in accordance with some embodiments. The optical transmission system 100 includes an optical source component 102, a DWDM multiplexer 106, a transmission line 110, an amplifier 108, an amplifier 112, a DWDM demultiplexer 114, and an optical receiver component 116. In some embodiments, the optical source component 102 is, or includes, a switch, a router, and/or a transponder. The optical source component 102 includes a plurality of transceivers 104 (e.g., 10G, 40G, 100G, and/or 200G transceivers). In some embodiments, the DWDM multiplexer 106 is a 40-channel multiplexer. In some embodiments, the DWDM demultiplexer 114 is a 40-channel demultiplexer. In some embodiments, the amplifier 108 is a boost EDFA component. In some embodiments, the amplifier 112 is a pre-EDFA component. In some embodiments, the transmission line 110 includes one or more in-line amplifiers. In some embodiments, the optical receiver component 116 is, or includes, a switch, a router, and/or a transponder. The optical receiver component 116 includes a plurality of transceivers 118 (e.g., 10G, 40G, 100G, and/or 200G transceivers). In some embodiments, the transceivers 104 and/or the transceivers 118 include one or more small form-factor pluggable (SFP) components. In some embodiments, the plurality of transceivers 104 and/or the transceivers 118 includes one or more transceivers with differing wavelengths (e.g., colors). In some embodiments, the transmission line 110 includes a boost amplifier (e.g., amplifier 108), one or more in-line amplifiers, and/or a pre-amplifier (e.g., amplifier 112).

Figure 2:
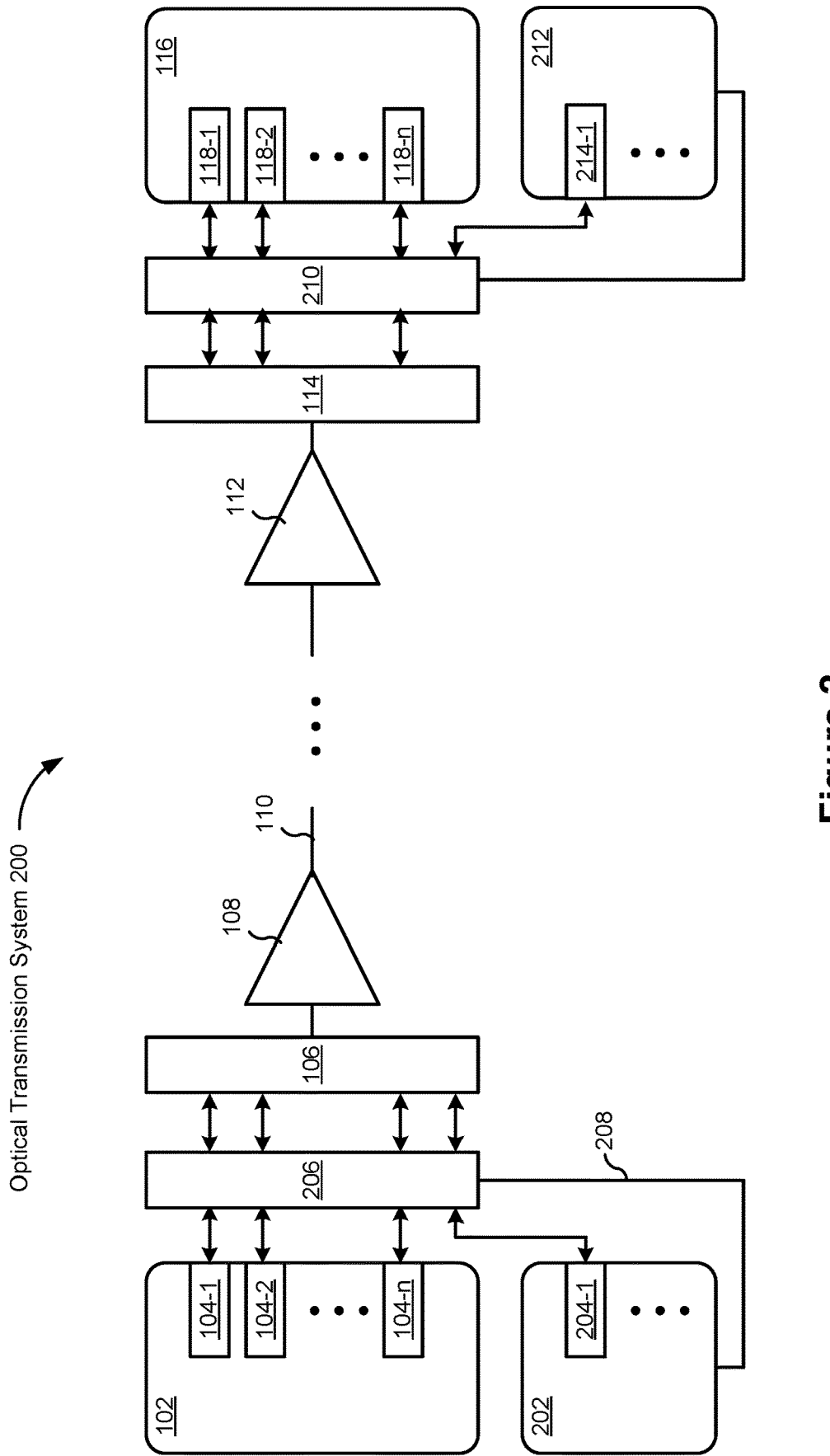
FIG. 2 illustrates another example optical transmission system in accordance with some embodiments.

FIG. 2 illustrates an optical transmission system 200 in accordance with some embodiments. The optical transmission system 200 includes components of the optical transmission system 100 as well as an optical source component 202, a power modulation device 206, a power modulation device 210, and an optical receiver component 212. In some embodiments, the optical source component 202 is, or includes, a switch, a router, and/or a transponder. The optical source component 202 includes one or more transceivers 204 (e.g., 400G and/or 800G transceivers). In some embodiments, the optical receiver component 212 is, or includes, a switch, a router, and/or a transponder. The optical receiver component 212 includes one or more transceivers 214 (e.g., 400G and/or 800G transceivers). In some embodiments, the transceivers 204 and/or the transceivers 214 include one or more small form-factor pluggable (SFP) components. In some embodiments, the plurality of transceivers 204 and/or the transceivers 214 includes one or more transceivers with differing wavelengths (e.g., colors). In some embodiments, the optical source component 202 is configured to use a DWDM wavelength not used by the optical source component 102 (e.g., an International Telecommunication union (ITU) alien (or dark) wavelength). In some embodiments, each of the transceivers 104 and 204 operate at different wavelengths.

In some embodiments, the transceivers 104 have a signal power in the range of 2 dBm to −4 dBm (e.g., within 5%, 10%, or 20% of 1 dBm), e.g., based on an Optical Interconnect Forum (OIF) standard. In some embodiments, the transceivers 104 have a signal power of about −10 dBm (e.g., within 5%, 10%, or 20% of −10 dBm).

In some situations, a signal power difference between transceivers of greater than 10 dBm results in a failure of the optical transmission system. For example, the lower power signals cannot get enough gain because the higher power signals will saturate (e.g., due to optical amplifier non-linear properties). In some situations, connecting the power modulation device 206 to the optical source component 102 includes temporarily disabling operation of the optical source component 102 (e.g., causing a disruption of service).

In some embodiments, the power modulation device 206 and/or 210 includes an array of variable optical attenuators (VOAs), e.g., a VOA for each transceiver 104 and 204. The power modulation device 206 is coupled to the optical source component 202 via a control line 208 (e.g., a USB or RJ45 line). In some embodiments, the control line 208 includes a power supply line (e.g., USB power). In some embodiments, the power modulation device 206 is configured to scan its input ports to determine an input port having a lowest signal power (e.g., a –10 dBm signal). In some embodiments, the power modulation device 206 is configured to attenuate each optical signal received via the input ports to bring each respective signal power closer to the lowest signal power (e.g., each signal power is within 1 dBm of a –10 dBm target level).

In some embodiments, the power modulation device 206 is configured to dynamically balance channel power between the optical source component 102 (e.g., a 10G component with a signal power around 1 dBm) and the optical source component 202 (e.g., a 400G component with a signal power around –10 dBm). In some embodiments, the power modulation device 206 is configured to operate with the optical source component 202, where the optical source component 202 is configured as a master controller and the power modulation device 206 is configured as a slave device.

In some embodiments, the power modulation device 206 is connected with the optical source component 202 via a USB cable or an Ethernet cable (e.g., which provide the required software management). In some embodiments, the power modulation device 206 (e.g., at power up) automatically scans and detects each input (e.g., each of 40 input ports). In some embodiments, the lowest port/channel input power is treated as a reference power level, and all the other higher power levels are automatically attenuated by the power modulation device 206, so that each output port has an equal power level (e.g., within 5%, 10%, or 20% of one another). For example, the power modulation device 206 attenuates one or more 10G signals to balance to a smaller 400G signal power. In some situations, the attenuation results in some degradation of the signals, but the system 200 optical signal-to-noise ratio (OSNR) is determined by the 400G signal. For example, if the system OSNR satisfies the 400G signal requirements, the 10G signal requirements are also met due to the 10G signal's relatively lower speeds.

Figure 3:
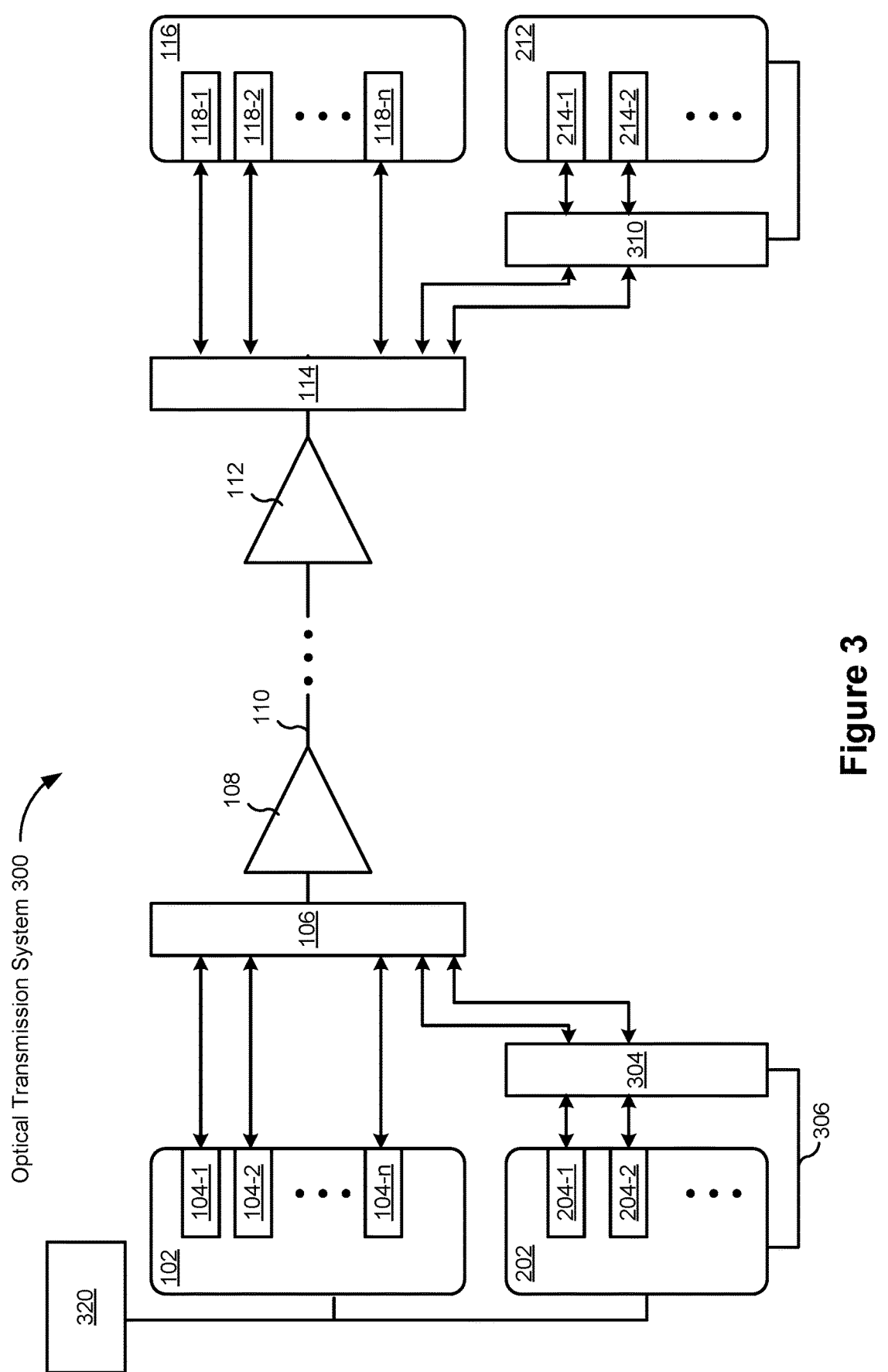
FIG. 3 illustrates another example optical transmission system in accordance with some embodiments.

FIG. 3 illustrates an optical transmission system 300 in accordance with some embodiments. The optical transmission system 300 includes components of the optical transmission system 100 as well as a controller 320, an optical source component 202, a power modulation device 304, a power modulation device 310, and an optical receiver component 212. In some embodiments, the power modulation device 304 and/or 310 includes an array of Erbium-doped fiber amplifiers (EDFAs), e.g., an EDFA for each transceiver 104 and 204. The power modulation device 304 is coupled to the optical source component 202 via a control line 306 (e.g., a USB or RJ45 line). In some embodiments, the control line 306 includes a power supply line (e.g., USB power). In some embodiments, the controller 320 is a software-defined network (SDN) controller. In some embodiments, the controller 320 is configured to control operation of the optical source component 102 and the optical source component 202.

In some embodiments, the power modulation device 304 is configured to dynamically balance channel power between the optical source component 102 (e.g., a 10G component with a signal power around 1 dBm) and the optical source component 202 (e.g., a 400G component with a signal power around –10 dBm). In some embodiments, the power modulation device 304 is configured to operate with the optical source component 202, where the optical source component 202 is configured as a master controller and the power modulation device 304 is configured as a slave device. In some embodiments, the power modulation device 304 is configured to use optical gain and/or amplification for channel power equalization. For example, the power modulation device 304 is configured to amplify signals from the optical source component 202 to match signal power of signals from the optical source component 102 (e.g., within 5%, 10%, or 20%).

In some embodiments, the power modulation device 304 (e.g., at power up) automatically scans and detects a power level for each input (e.g., 40 input ports) and sets the output power of the EDFA array device based on power level(s) of the optical source component 102 (e.g., a target power level conveyed via the controller 320 and/or the optical source component 202). In some embodiments, a target output power level is transmitted to the power modulation device 304 via a network management system, so that the power modulation device 304 automatically adjusts each port gain based on its input power level and the target output power.

In some embodiments, the controller 320 obtains (e.g., reads) transmitter power levels from the optical source component 102 (e.g., corresponding to transceivers 104) and assigns the highest transmitter power level as the target output power for the power modulation device 304. In some embodiments, the controller 320 sends the target output power to the optical source component 202 and a controller of the optical source component 202 relays the target output power to the power modulation device 304 via the control line 306 (e.g., a USB or Ethernet connection). In some embodiments, the power modulation device 304 then adjusts a gain for each EDFA device according to the target output power and locally monitored input power levels.

Figure 4A:
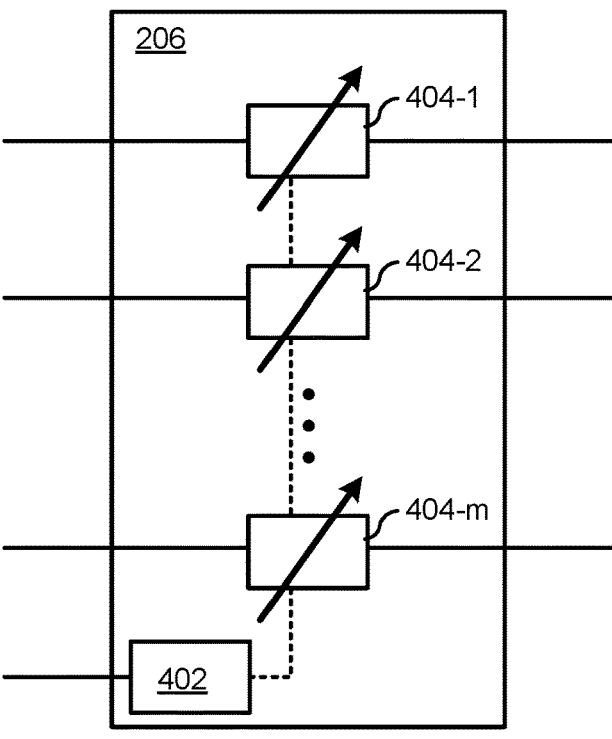
FIG. 4A-4B illustrates example power modulation devices in accordance with some embodiments.
Figure 4B:
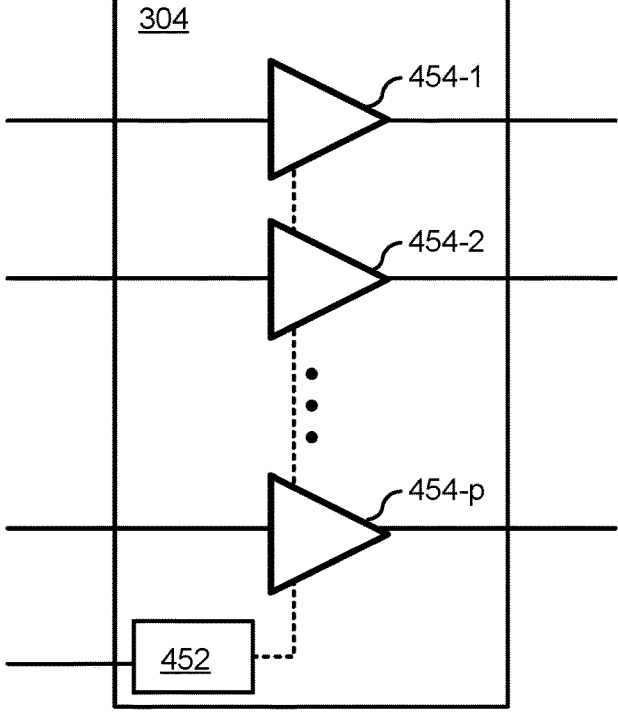

FIGS. 4A-4B illustrate example power modulation devices in accordance with some embodiments. FIG. 4A shows components of the power modulation device 206 in accordance with some embodiments. As shown in FIG. 4A, the power modulation device 206 includes a plurality of attenuators 404 (e.g., an array of VOA devices) coupled between respective input and output ports and control circuitry 402. In some embodiments, the power modulation device 206 does not include a CPU or processor (e.g., does not include an x86 processor). In some embodiments, the control circuitry 402 includes logic for management of the attenuators 404 (e.g., adjusting levels of attenuation), scanning incoming signal power levels, communicating with optical source and/or receiver components, and/or alarm management functions. In some embodiments, the power modulation device 206 is configured to operate at less than 20 watts (e.g., around 10 watts).

In some embodiments, the power modulation device 206 receives electrical power from USB or Ethernet (e.g., control line 208) from the optical source component 202 (e.g., 10W). In some embodiments, the control circuitry 402 is, or includes, a complex programmable logic device (CPLD) and/or an erasable programmable read-only memory (EPROM). In some embodiments, the power modulation device 206 operates in a self-sustained mode, e.g., does not require complex software configuration and management. In some embodiments, the power modulation device 206 automatically scans and detects each port input power level (e.g., monitors the inputs), uses the lowest power as a reference, and attenuates the other input ports (e.g., so that all inputs are substantially equal and balanced). In some embodiments, this process is performed at the power modulation device 206 (e.g., the control circuitry 402) without involvement from a master controller (e.g., a controller of the optical source component 202). In some embodiments, after the dynamic power balancing is completed, the power modulation device 206 is configured to report power management information, such as current input and output power levels to the master controller (e.g., a controller of the optical source component 202). In some embodiments, if the input power is too low, the power modulation device 206 is configured to generate an input power low alarm. In some embodiments, a low power threshold is obtained from the master controller (e.g., via the control line 208). In some embodiments where the control line 208 is an Ethernet connection, the power modulation device 206 includes an Ethernet hub (e.g., to duplicate an Ethernet port). In some embodiments, the power modulation device 210 of FIG. 2 is an instance of the power modulation device 206. In some embodiments, the power modulation device 210 is configured to modulate signals from the optical receiver components 116 and/or 212 (e.g., the optical receiver components 116 and/or 212 are transceiver components).

FIG. 4B shows components of the power modulation device 304 in accordance with some embodiments. As shown in FIG. 4B, the power modulation device 304 includes a plurality of amplifiers 454 (e.g., an array of EDFA devices) coupled between respective input and output ports and control circuitry 452. In some embodiments, the power modulation device 304 does not include a CPU or processor (e.g., does not include an x86 processor). In some embodiments, the control circuitry 452 includes logic for management of the amplifiers 454 (e.g., adjusting levels of gain/amplification), scanning incoming signal power levels, communicating with optical source and/or receiver components, and/or alarm management functions. In some embodiments, the power modulation device 304 is configured to operate at less than 100 watts (e.g., around 80 watts).

In some embodiments, the power modulation device 304 includes, or is connected to, a power supply unit (e.g., with redundancy of about 80 W each). In some embodiments, the control circuitry 452 is, or includes, a complex programmable logic device (CPLD) and/or an erasable programmable read-only memory (EPROM). In some embodiments, the power modulation device 304 operates as a slave device for the optical source component 202 (e.g., receiving instructions/information about target output power). In some embodiments, the power modulation device 304 automatically setups corresponding gains for amplifiers 454 for the received target output power. In some embodiments where the control line 306 is an Ethernet connection, the power modulation device 304 includes an Ethernet hub (e.g., to duplicate an Ethernet port).

In some embodiments, the power modulation device 310 is an instance of the power modulation device 304 of FIG. 3. In some embodiments, the power modulation device 310 is configured to modulate signals from the optical receiver component 212 (e.g., the optical receiver component 212 is a transceiver component).

Figure 5:
FIG. 5 provides a flowchart of a method of power modulation for an optical signal in accordance with some embodiments.
Figure 5:
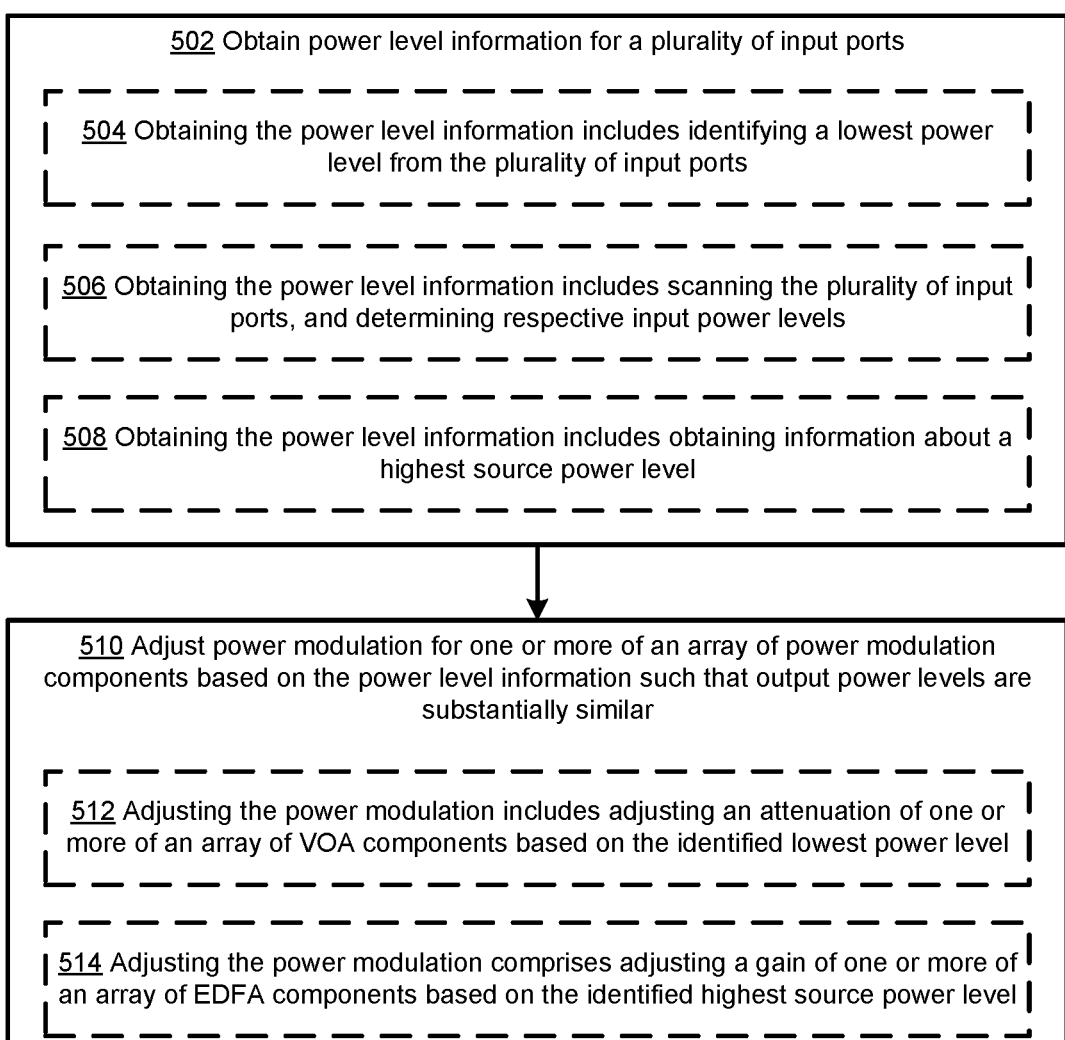

FIG. 5 provides a flowchart of a method 500 of power modulation for an optical signal in accordance with some embodiments. In some embodiments, the method 500 is performed at a power modulation device (e.g., the power modulation device 206 or the power modulation device 304). In some embodiments, the method 500 is performed at an optical transmission system (e.g., the optical transmission system 200 or the optical transmission system 300). For clarify, the method 500 is described below as being performed by a power modulation device.

In some embodiments, the power modulation device includes a plurality of optical input ports, a plurality of optical output ports, an array of power modulation components, each power modulation component coupled between a respective input port of the plurality of input ports and a corresponding output port of the plurality of output ports, and control circuitry coupled to the array of power modulation components, the control circuitry configured to perform operations of the method 500.

In some embodiments, the plurality of output ports are configured to couple to a dense wavelength-division multiplexing (DWDM) component. In some embodiments, the power modulation device includes a control port coupled to the control circuitry and configured to couple to one or more optical source components. In some embodiments, the control port is, or includes, a universal serial bus (USB) port or a registered jack (RJ) port (e.g., an RJ45 port). In some embodiments, the control port is configured to be coupled to a power source (e.g., a USB power source) for the device. In some embodiments, the plurality of input ports are configured to couple to one or more optical source components. In some embodiments, the one or more optical source components include one or more switches, one or more transponders, and/or one or more routers (e.g., a 10G, 40G, 100G, 200G, or 400G source component). In some embodiments, the power modulation device does not include a processor (e.g., does not include a CPU or x86 processor). In some embodiments, the power modulation device is configured to modulate a plurality of optical signals having differing optical characteristics (e.g., different wavelengths and/or operating rates). In some embodiments, the array of power modulation components is an array of variable optical attenuator (VOA) components. In some embodiments, the array of power modulation components includes an array of Erbium-doped fiber amplifier (EDFA) components.

The power modulation device obtains (502) power level information for a plurality of input ports. For example, the power modulation device obtains power level information for each input signal from one or more optical source components (e.g., the optical source components 102 and/or 202).

In some embodiments, obtaining the power level information includes (504) identifying a lowest power level from the plurality of input ports. In some embodiments, the lower power level is identified as a reference level and/or target output level. For example, the lowest power level may correspond to a highest bandwidth signal (e.g., a 400G signal).

In some embodiments, obtaining the power level information includes (506) scanning the plurality of input ports, and determining respective input power levels. In some embodiments, the power modulation device determines the respective input power levels and a target output power level and modulates each input power level to match the target output power level (e.g., match within 1%, 5%, 10%, or 20%).

In some embodiments, obtaining the power level information includes (508) obtaining information about a highest source power level. For example, the information about the highest source power level is obtained from an optical source component (e.g., the optical source component 202)

and/or a network controller (e.g., the controller 320). For example, the highest source power level may correspond to a lowest bandwidth signal (e.g., a 10G signal).

The power modulation device adjusts (510) power modulation for one or more of an array of power modulation components based on the power level information such that output power levels are substantially similar (e.g., within 1%, 5%, 10%, or 20% of one another).

In some embodiments, adjusting the power modulation includes (512) adjusting an attenuation of one or more of an array of VOA components (e.g., the attenuators 404) based on the identified lowest power level. For example, the power modulation device attenuates each input signal such that the output signals are substantially similar.

In some embodiments, adjusting the power modulation includes (514) adjusting a gain of one or more of an array of EDFA components (e.g., the amplifiers 454) based on the identified highest source power level. For example, the power modulation device increases a gain of each input signal such that the output signals are substantially similar.

The optical transmission systems described herein (e.g., the optical transmission systems 200 and 300) allow for deployment of additional optical source components (e.g., the optical source component 202) having different signal characteristics (e.g., 10G, 40G, 100G, 200G, 400G, and/or 800G) without losing existing service (e.g., provided via the optical source component 102). In this way, customers can not only reuse their existing transmission network and components; they can also migrate to newer technology (e.g., higher bandwidth components) without needing to replace the existing optical line system. The power modulation devices described herein provide dynamic power balancing among all input signals (e.g., e.g., 10G, 40G, 100G, 200G, 400G, and/or 800G signals). In some embodiments, the power modulation devices include respective VOA arrays configured to attenuate the higher input power signals (e.g., corresponding to 10G components) and balance them to lower input power signals (e.g., corresponding to 400G components), so that the optical signals are equalized before they continue through the optical line system (e.g., DWDM multiplexer 106 and/or transmission line 110). In some embodiments, the power modulation devices include respective EDFA arrays configured so that small input power signals are amplified before they continue through the optical line system.

Some embodiments include an optical system (e.g., the optical transmission system 200 or the optical transmission system 300) comprising: a plurality of optical source components (e.g., the optical source components 102 and/or 202), a source DWDM component (e.g., the DWDM multiplexer 106), and a power modulation device (e.g., the power modulation device 206 or 304) configured to perform operations of the method 500. In some embodiments, the power modulation device is coupled between at least a subset of the plurality of optical source components and the source DWDM component. In some embodiments, the plurality of optical source components are configured to operate at different wavelengths. In some embodiments, the power modulation device is coupled between two or more optical networks, the two or more optical networks having different optical signal characteristics (e.g., different wavelengths, operating rates, and/or operating conditions (e.g., conforming to different standards)). In some embodiments, the plurality of optical source components are configured to operate at different rates (e.g., 10, 40, 100, 200, and/or 400 gigabits per second). In some embodiments, the optical system further includes a destination DWDM component (e.g., the DWDM demultiplexer 114), a plurality of optical destination components (e.g., the optical receiver components 116 and/or 212), and a power modulation device (e.g., the power modulation device 210 or 310) coupled between at least a subset of the plurality of optical destination components and the destination DWDM component, the power modulation device configured to modulate outputs of the destination DWDM component (e.g., configured to reverse the power modulation performed by the source-side power modulation device).

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first and second are, in some instances, used herein to describe various elements, these elements should not be limited by these terms. These terms are used only to distinguish one element from another.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope to the precise forms disclosed. Many modifications and variations are possible in view of the above teachings. The embodiments were chosen and described in order to best explain the main principles and practical applications, to thereby enable others skilled in the art to best utilize the various embodiments and make various modifications as are suited to the particular use contemplated.

What is claimed is:

1. A device, comprising:

a plurality of optical input ports;

a plurality of optical output ports;

an array of power modulation components, each power modulation component coupled between a respective optical input port of the plurality of optical input ports and a corresponding optical output port of the plurality of optical output ports, wherein the array of power modulation components comprises an array of Erbium-doped fiber amplifier (EDFA) components; and control circuitry coupled to the array of power modulation components, the control circuitry configured to:

obtain power level information for the plurality of optical input ports, including obtaining information about a highest source power level; and adjust power modulation for one or more of the array of power modulation components based on the power level information such that output power levels are substantially similar, including adjusting a gain of one or more of the array of EDFA components based on the highest source power level.

2. The device of claim 1, wherein the plurality of optical output ports are configured to couple to dense wavelength-division multiplexing (DWDM) component.

3. The device of claim 1, further comprising a control port coupled to the control circuitry and configured to couple to one or more optical source components.

4. The device of claim 1, wherein the plurality of optical input ports are configured to couple to one or more optical source components.

5. The device of claim 1, wherein the device does not include a central processing unit or an x86 processor.

6. The device of claim 1, wherein the device is configured to modulate a plurality of optical signals having differing optical characteristics.

7. The device of claim 1, wherein the array of EDFA components comprises an array of EDFA boost components.

8. The device of claim 1, wherein the plurality of optical input ports are configured to couple to a plurality of optical source components.

9. The device of claim 1, wherein the plurality of optical input ports are configured to couple to optical source components operating at different wavelengths.

10. The device of claim 1, wherein the array of power modulation components are coupled to an optical source component via a control line.

11. The device of claim 1, wherein the control line comprises a power supply line.

12. An optical system, comprising:

a plurality of optical source components;

a source DWDM component; and a device coupled between at least a subset of the plurality of optical source components and the source DWDM component, the device comprising:

a plurality of optical input ports;

a plurality of optical output ports;

an array of power modulation components, each power modulation component coupled between a respective optical input port of the plurality of optical input ports and a corresponding optical output port of the plurality of optical output ports, wherein the array of power modulation components comprises an array of Erbium-doped fiber amplifier (EDFA) components; and control circuitry coupled to the array of power modulation components, the control circuitry configured to:

obtain power level information for the plurality of optical input ports, including obtaining information about a highest source power level; and adjust power modulation for one or more of the array of power modulation components based on the power level information such that output power levels are substantially similar, including adjusting a gain of one or more of the array of EDFA components based on the highest source power level.

13. The optical system of claim 12, wherein the plurality of optical source components are configured to operate at different wavelengths.

14. The optical system of claim 12, wherein the device is coupled between two or more optical networks, the two or more optical networks having different optical signal characteristics.

15. The optical system of claim 12, wherein the plurality of optical source components are configured to operate at different rates.

16. The optical system of claim 12, further comprising:

a destination DWDM component;

a plurality of optical destination components; and a power modulation device coupled between at least a subset of the plurality of optical destination components and the destination DWDM component, the power modulation device configured to modulate outputs of the destination DWDM component.

17. The optical system of claim 12, wherein the array of EDFA components comprises an array of EDFA boost components.

18. The optical system of claim 12, wherein the array of power modulation components are coupled to the plurality of optical source components via one or more control lines.

19. The optical system of claim 12, wherein the one or more control lines comprise a power supply line.

20. The optical system of claim 12, wherein the source DWDM component comprises a multi-channel multiplexer.

* * * * *